J. H. COOPER.
TIRE.
APPLICATION FILED NOV. 2, 1918.
1,301,230.  Patented Apr. 22, 1919.
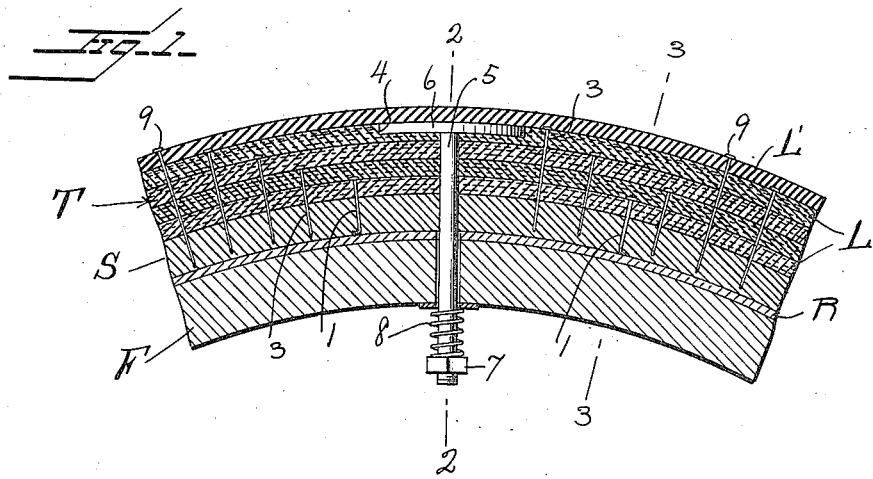
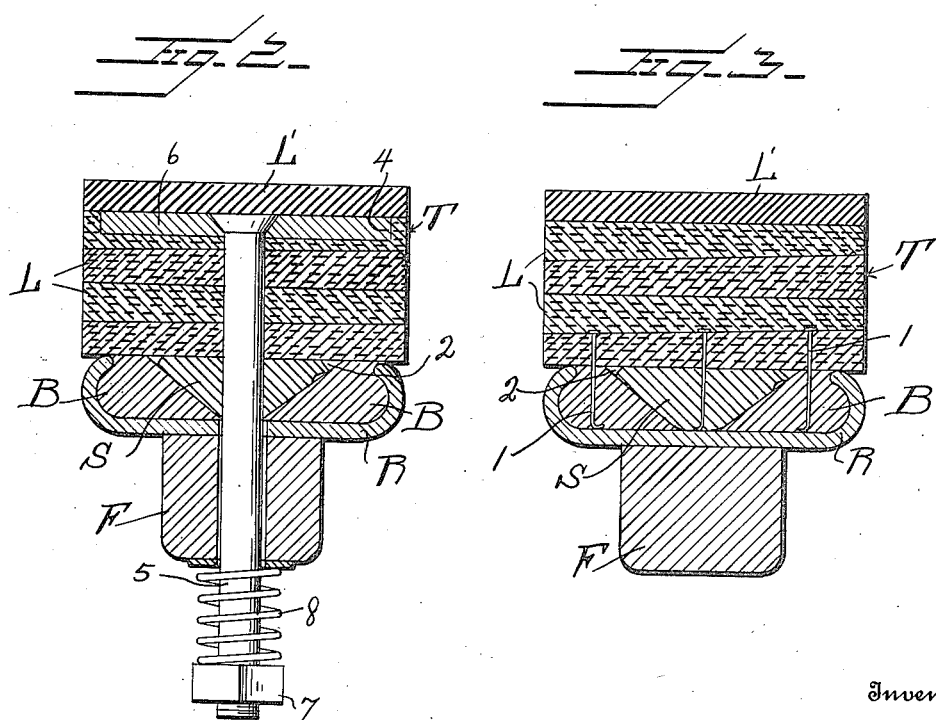
Inventor
J. H. Cooper
By Watson E. Coleman
Attorney

UNITED STATES PATENT OFFICE.

JAMES H. COOPER, OF SYNDER, OKLAHOMA.

TIRE.

1,301,230. Specification of Letters Patent. Patented Apr. 22, 1919.

Application filed November 2, 1918. Serial No. 260,894.

*To all whom it may concern:*

Be it known that I, JAMES H. COOPER, a citizen of the United States, residing at Snyder, in the county of Kiowa and State of Oklahoma, have invented certain new and useful Improvements in Tires, of which the following is a specification, reference being had to the accompanying drawings.

This invention relates to certain improvements in tires for the wheels of automobiles or other vehicles, and has relation more particularly to a tire of a cushioned type, and it is an object of the invention to provide a novel and improved tire of this general character which is adapted to be builded directly on the rim so that the tire is substantially permanently applied.

It is also an object of the invention to provide a novel and improved tire of this general character which comprises a plurality of imposed layers or laminations suitably connected one to the other, together with additional means coacting with the tire for maintaining the same in applied position upon a wheel rim, said last named means being mounted for radial movement so that the same offers no hindrance or obstruction to the cushioning action of the tire proper.

Another object of the invention is to provide a tire of this general character particularly adapted for use in connection with a rim of a clencher type, and which tire is provided with novel and improved means whereby the same is effectually engaged with the rim.

A still further object of the invention is to provide a novel and improved tire which is adapted to be built up from superimposed layers or laminations produced from the discarded or worn tire casings or carcasses of the type now generally employed, and whereby a substantially solid tire is produced possessing a high degree of cushioning action.

The invention consists in the details of construction and in the combination and arrangement of the several parts of my improved tire whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary sectional view taken circumferentially of a tire, and a coacting rim constructed in accordance with an embodiment of my invention;

Fig. 2 is an enlarged sectional view taken substantially on the line 2—2 of Fig. 1; and Fig. 3 is a sectional view taken substantially on the line 3—3 of Fig. 1.

As disclosed in the accompanying drawings, R denotes a rim of a clencher type suitably affixed upon the felly F and coacting with the rim R is a tire T constructed in accordance with an embodiment of my invention.

As herein disclosed, my improved tire T comprises a plurality of superimposed and circumferentially directed laminations L preferably formed from the side portions of a discarded tire casing or carcass, and in order that the tread surface of the tire T may be level, it is to be noted that the heavy marginal portions of the laminations L are reversely directed. The heavy or thicker ends of the laminations L are a result of the structure of the tire casing or carcass, as it is the ordinary method to have the side walls of the tire casing or carcass gradually decrease in thickness toward the beads.

B denotes circumferentially disposed bead strips secured to the inner face of the inner laminations L by the metallic brads or shanks 1, and which bead strips B coact with the rim R in a conventional manner. In practice the bead strips B are the beads cut from a discarded or worn tire casing.

With the bead strips B in applied position, it is to be noted that the opposite walls or faces 2 thereof are arranged in convergence toward the rim R with the bead strips being in separated relation.

S denotes a circumferentially disposed strip substantially midway of the inner lamination L, and which snugly fits between the bead strips B so that the inner lamination L is positioned substantially flush with the outer or open face of the rim R. It will also be self-evident that the strip S serves as a wedge whereby the proper coaction between the strips B and the rim R is assured.

As clearly illustrated in the accompanying drawings, the laminations L are four in number, and said laminations are successively secured to each other by the shanks or metallic brads 3, and which brads or shanks extend through the inner laminations L and the strips B and S, but terminate outwardly of the rim R, so that when the tire is under compression said brads or shanks 3 will not hinder or interfere with the desired cushioning action.

At predetermined points circumferentially thereof the outer face of the outer lamination L is provided with a recess 4 in which is positioned the head of an inwardly directed bolt or shank 5 which is disposed through the laminations L and the strip S and is loosely directed through an opening 5 in the rim R and felly F. Fitting within the recess 3 is a metallic washer 6, through which the bolt or shank 5 is also directed, and said washer 6 extends substantially entirely across the outer lamination L whereby the coaction of the bolt or shank 5 therewith is materially facilitated.

The bolt or shank 5 terminates inwardly of the felly F and has threaded thereon a nut 7 and interposed between said nuts 7 and the adjacent face of the felly F is an expansible member 8 herein disclosed as a coil spring encircling the extended end portion of the bolt or shank 5.

Each of the bolts or shanks 5 serves to maintain the tire T in applied position, and the functioning of said bolt or shank 5 is further facilitated by the expansible member or spring 8 as the bolt or shank 5 is constantly urged inwardly of the felly F, but is capable of movement in accordance with the expansion or depression of the tire T.

Disposed circumferentially around the outer lamination L is a tread lamination L' which preferably comprises a strip cut from the tread portion of a discarded tire casing or carcass. The lamination L' is held in applied position by the elongated metallic brads or shanks 9 which also extends through the laminations L and terminates a predetermined distance outwardly of the rim R so that no interference will be offered thereby to the cushioning action of the tire T.

By having the bolt or shank 5 capable of endwise movement through the rim R and felly F it will be at once self-evident that the bolt or shank 5 will move inwardly when a blow is imposed upon the outer or head end portion thereof as the tire rolls, so that the life of the completed tire is materially prolonged. It has also been fully demonstrated in practice that by having the expansible member or spring 8 constantly urging the bolt or shank 5 inwardly prevents the bolt or shank 5 from becoming laterally distorted, as said bolt or shank 5 will have inward movement in substantially a straight path immediately upon stress being imposed upon the head end portion of said shank or bolt 5 and which would not be true without the use of the expansible member or spring 8.

As is particularly illustrated in Figs. 1 and 2, it is to be noted that the washer 6 substantially entirely fills the recess 4 so that the outer periphery of the outer lamination L is substantially unobstructed, so that the tread lamination L' will be arranged substantially unobstructed and even.

From the foregoing description, it is thought to be obvious that a tire constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with a rim, laminations disposed circumferentially therearound, and a plurality of circumferentially spaced and inwardly disposed shanks directed through certain of the laminations, said shanks being loosely directed through the rim, and means for constantly urging the shanks inwardly of the rim, the inner end of each of the shanks being provided with a head between adjacent laminations.

2. In combination with a rim, laminations disposed circumferentially therearound, and a plurality of circumferentially spaced and inwardly disposed shanks directed through certain of the laminations, said shanks being loosely directed through the rim, and means for constantly urging the shanks inwardly of the rim, the inner end of each of the shanks being provided with a head between adjacent laminations, a face of one of said laminations being recessed to receive the head.

3. In combination with a rim, a tire of yielding material disposed circumferentially of the rim, a plurality of shanks having their inner end portions arranged within the tire, the outer portions of the shanks being loosely directed through the rim, and means for constantly urging the shanks inwardly of the rim.

In testimony whereof I hereunto affix my signature in the presence of two witnesses.

JAMES H. COOPER.

Witnesses:
W. E. LAWSON,
LOLA WALKER.